United States Patent
Kim et al.

(10) Patent No.: US 9,166,225 B2
(45) Date of Patent: Oct. 20, 2015

(54) SODIUM VANADIUM OXIDE ANODE MATERIAL FOR SODIUM ION SECONDARY BATTERY, PREPARATION METHOD THEREOF AND SODIUM ION SECONDARY BATTERY HAVING THE SAME

(71) Applicant: KOREA INSTITUTE OF SCIENCE AND TECHNOLOGY, Seoul (KR)

(72) Inventors: Hyung Sun Kim, Seoul (KR); Byung Won Cho, Seoul (KR); Si Hyoung Oh, Gyeongsangbuk-do (KR); Ju Hyeon Ahn, Seoul (KR); Yong Ho Lee, Incheon (KR); Won Chang Choi, Gyeonggi-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 248 days.

(21) Appl. No.: 13/966,497

(22) Filed: Aug. 14, 2013

(65) Prior Publication Data

US 2014/0363739 A1    Dec. 11, 2014

(30) Foreign Application Priority Data

Jun. 7, 2013    (KR) ........................ 10-2013-0065237

(51) Int. Cl.
*H01M 4/485*    (2010.01)
*C01D 1/02*    (2006.01)
(Continued)

(52) U.S. Cl.
CPC ................. *H01M 4/485* (2013.01); *C01D 1/02* (2013.01); *C01G 31/02* (2013.01); *H01M 10/054* (2013.01); *H01M 2004/027* (2013.01); *Y02E 60/122* (2013.01)

(58) Field of Classification Search
None
See application file for complete search history.

(56) References Cited

U.S. PATENT DOCUMENTS

2008/0118840 A1    5/2008    Yew et al.
2008/0241688 A1    10/2008    Tokita et al.

FOREIGN PATENT DOCUMENTS

JP    2002-216753 A    8/2002
KR    1020060009193 A    1/2006
(Continued)

OTHER PUBLICATIONS

David Hamani, et al; "$Na_xVO_2$ as possible electrode for Na-ion batteries", Electrochemistry Communications, vol. 13. pp. 938-941; Available online Jun. 12, 2011.
(Continued)

*Primary Examiner* — Ula C Ruddock
*Assistant Examiner* — Matthew Van Oudenaren
(74) *Attorney, Agent, or Firm* — Ladas & Parry LLP

(57) ABSTRACT

There is provided a preparation method of a sodium vanadium oxide-based ($Na_{1+x}V_{1-x}O_2$) anode material for a sodium ion secondary battery synthesized by mixing particles of precursors such as sodium carbonate ($Na_2CO_3$) and vanadium oxide ($V_2O_3$) and pyrolyzing a mixture in a mixed gas atmosphere composed of 90 mol % of nitrogen gas and 10 mol % of hydrogen gas through a solid-state reaction. The sodium vanadium oxide-based anode material prepared according to the present invention shows a small change in volume caused by an initial irreversible capacity and continuous charge/discharge reactions, and thus it is useful for providing a next-generation sodium ion secondary battery having stable charge/discharge characteristics and cycle performance.

9 Claims, 6 Drawing Sheets

(51) Int. Cl.
  *H01M 4/02* (2006.01)
  *C01G 31/02* (2006.01)
  *H01M 10/054* (2010.01)

(56) References Cited

FOREIGN PATENT DOCUMENTS

| KR | 1020080056637 A | 6/2008 |
|---|---|---|
| KR | 1020080063063 A | 7/2008 |
| KR | 1020080093777 A | 10/2008 |
| KR | 1020080093778 A | 10/2008 |
| KR | 1020080093779 A | 10/2008 |
| KR | 1020080093780 A | 10/2008 |
| KR | 1020080093781 A | 10/2008 |
| KR | 1020080093782 A | 10/2008 |
| KR | 1020090010341 A | 1/2009 |

OTHER PUBLICATIONS

Translation of Korean Intellectual Property Office Notice of Rejection Issued on Nov. 27, 2014; Appln. No. 10-2013-0065237.

SODIUM VANADIUM OXIDE ANODE MATERIAL FOR SODIUM ION SECONDARY BATTERY, PREPARATION METHOD THEREOF AND SODIUM ION SECONDARY BATTERY HAVING THE SAME

CROSS-REFERENCE TO RELATED APPLICATION

This application claims priority to and the benefit of Korean Patent Application No. 2013-0065237, filed on Jun. 7, 2013, the disclosure of which is incorporated herein by reference in its entirety.

BACKGROUND

1. Field of the Invention

The present invention relates to a sodium vanadium oxide-based anode material for a sodium ion secondary battery, a preparation method thereof, and a sodium ion secondary battery having the same.

2. Discussion of Related Art

A conventional vanadium oxide-based anode material has been applied to a sodium ion secondary battery in some preceding researches. However, its application is limited to a cathode material, and in most cases, a lithium vanadium oxide-based anode material mainly for a lithium ion secondary battery has been prepared by performing pyrolysis with precursors such as lithium carbonate ($Li_2CO_3$) and vanadium oxide ($V_2O_3$) in a pure nitrogen atmosphere.

Specifically, conventional technologies relevant to a lithium vanadium oxide-based anode material for a lithium ion secondary battery include a method for mixing precursors such as $Li_2CO_3$, and $V_2O_5$ with an organic acid such as $(COOH)_2$ and plasticizing a mixture (Korean Patent Application No.: 2007-0120974, SAMSUNG SDI Co., Ltd.), a method for preparing an anode material using crystalline vanadium such as $LiNiVO_4$ and $LiMnVO_4$ (Korean Patent Application No.: 2004-0056699, Korea Electrotechnology Research Institute), an anode material expressed by $Li_aMg_b$-$VO_c$ ($0.05<=a<=3$, $0.12<=b<=2$, $2<=2c-a-2b<=5$) (Japanese Patent Laid-open Publication No.: 2002-216753, Sumitomo Metal Ind. Ltd.), a method for preparing a lithium vanadium oxide-based anode material by a sol-gel method using lithium salt and vanadium salt (Korean Patent Application Nos.: 2007-0037983~0037988, SAMSUNG SDI Co., Ltd.), a method for preparing an active material precursor by mixing lithium salt, vanadium salt, and additive salt with a hydrothermal solvent and a method for preparing an anode material by performing reduction and calcination of the active material precursor (Korean Patent Application No.: 2007-0073377, SAMSUNG SDI Co., Ltd.), a method for preparing an anode material expressed by $Li_aMg_bVO_c$ ($0.05<=a<=3$, $0.12<=b<=2$, $2<=c-a-2b<=5$) or a lithium vanadium oxide-based anode material including an oxide expressed by $Ce_{0.7}Zr_{0.3}O_{1.9}$ (US Patent Laid-open Publication No.: 2008/0241688), a preparation method using a surface treatment for coating a surface of a lithium vanadium oxide-based anode material expressed by $Li_{1.1}Ti_{0.1}V_{0.9}O_2$ with an inorganic oxide such as $SiO_2$ (US Patent Laid-open Publication No.: 2008/0118840), a method for preparing an anode material by mixing lithium vanadium oxide and additives such as $ZrO_2$ and $Y_2O_3$ (Korean Patent Application No.: 2007-0120978, SAMSUNG SDI Co., Ltd.), and the like.

As described above, many kinds of materials have been developed as a lithium vanadium oxide-based anode material for a lithium ion secondary battery until now, and since the lithium ion secondary battery market and industry are anticipated to be rapidly expanded, the demand therefor is expected to greatly increase. However, lithium as an essential metal for synthesizing an electrode material or relevant compounds do not exist in Korea, and thus all of such resources have been imported from abroad.

Therefore, as for a country with lack of natural resources like Korea, development of a new alternative anode material is needed. The present invention provides a sodium vanadium oxide-based anode material that is an anode material using sodium as a means for replacing such a lithium resource.

SUMMARY OF THE INVENTION

The present invention is directed to a sodium vanadium oxide-based anode material for a sodium ion secondary battery improved in low initial charge/discharge efficiency as the biggest problem in commercialization of a sodium vanadium oxide-based anode material, output characteristics, and cycle performance, and to a preparation method thereof.

Further, the present invention is directed to a sodium ion secondary battery having characteristics of high output, high capacity, and long life by providing a sodium vanadium oxide-based anode material improved in electrode formulation density as compared with conventional anode materials such as carbon-based anode materials and transition metal-based anode materials.

Also, the present invention is directed to a sodium ion secondary battery anode material that is expressed by $Na_{1+x}V_{1-x}O_2$ ($x=0.1, 0.13, 0.16$) and prepared by mixing precursor particles such as $Na_2CO_3$ and $V_2O_3$ in various stoichiometric ratios and heat-treating a mixture at a high temperature with a mixed gas consisting of an inert gas such as argon and nitrogen and a hydrogen gas.

According to a first aspect of the present invention, there is provided an anode material for a sodium ion secondary battery having a composition formula of $Na_{1+x}V_{1-x}O_2$ ($x=0.1$ to $0.2$).

According to a second aspect of the present invention, there is provided a preparation method of an anode material for a sodium ion secondary battery having a composition formula of $Na_{1+x}V_{1-x}O_2$ ($x=0.1$ to $0.2$), in which the preparation method includes a first process for mixing a sodium source material with a vanadium source material and a second process for preparing sodium vanadium oxide by heating a mixture obtained from the first process in a partially reducing atmosphere through a solid-state reaction.

The sodium source material may include sodium carbonate ($Na_2CO_3$), and the vanadium source material may include vanadium oxide ($V_2O_3$).

The partially reducing atmosphere may be a mixed gas atmosphere composed of 90 mol % of nitrogen and 10 mol % of hydrogen.

The first process may be carried out by mechanically milling and mixing particles of the sodium source material and particles of the vanadium source material.

The particles of the sodium source material and the particles of the vanadium source material may have an average particle diameter in a range of 100 nm to 20 μm.

A heating temperature of the second process may be in a range of 500° C. to 1300° C.

According to a third aspect of the present invention, there is provided a sodium ion secondary battery including a positive electrode, a negative electrode, a separation film positioned between the positive electrode and the negative electrode, and electrolyte, in which the negative electrode may include a material having a composition formula of $Na_{1+x}V_{1-x}O_2$ (x=0.1 to 0.2).

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
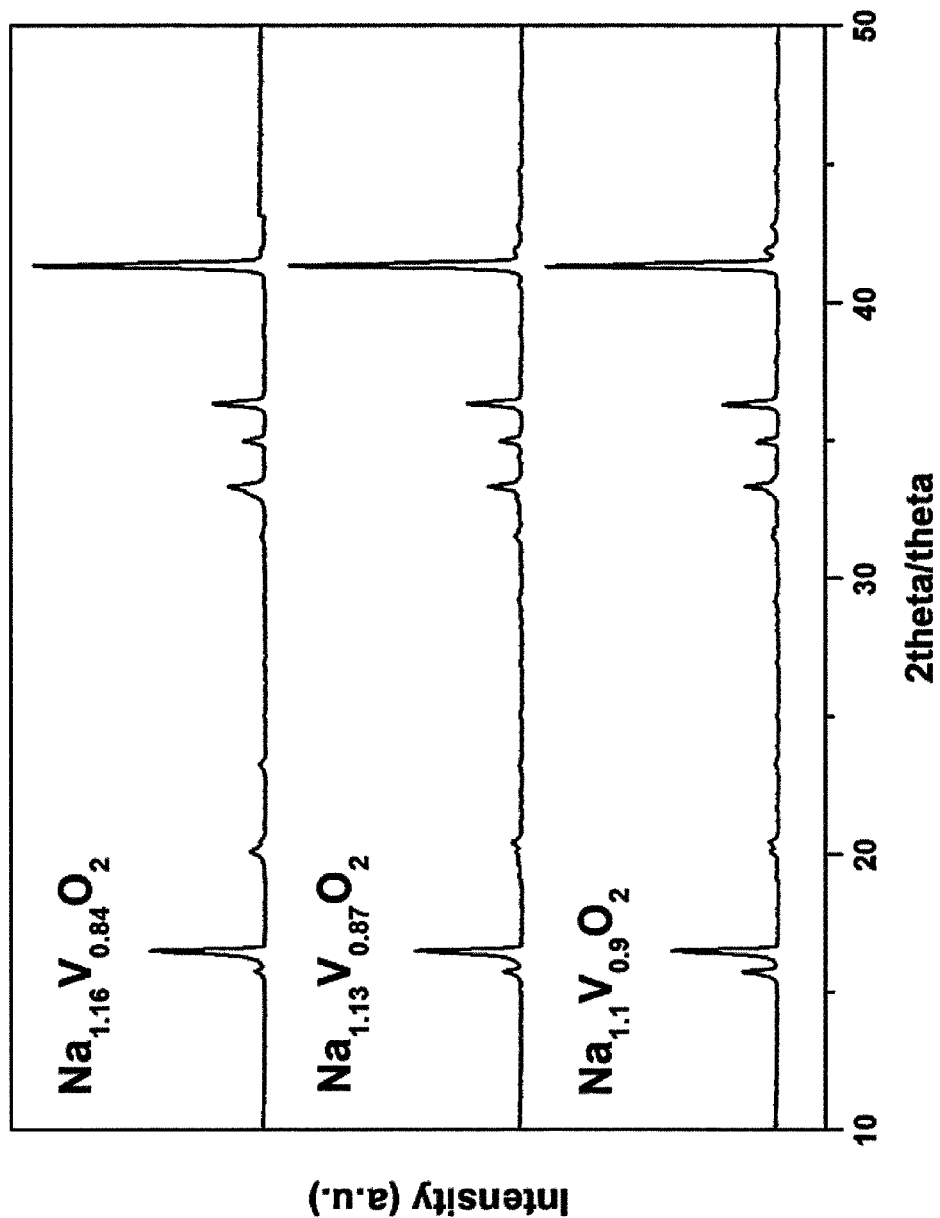
FIG. 1 is a result of an X-ray diffraction analysis on sodium vanadium oxide powders according to Examples 1 to 3.

Hereinafter, exemplary embodiments of the present invention will be described in detail with reference to the accompanying drawings. The exemplary embodiments can be changed and modified in various ways, and the scope of the present invention is not limited to the exemplary embodiments to be described below. Further, the exemplary embodiments are provided to more completely explain the present invention to those skilled in the art. Therefore, shapes and sizes of elements shown in the drawings may be exaggerated for the sake of clearer explanation, and like reference numerals denote like parts through the drawings.

According to a first aspect of the present invention, there is provided an anode material for a sodium ion secondary battery having a composition formula of $Na_{1+x}V_{1-x}O_2$ (x=0.001 to 0.2). When the x is greater than 0.2, charge/discharge characteristics and cycle characteristics may be deteriorated. A lower limit of the x is described as 0.001, which means that sodium is included in the anode material for a sodium ion secondary battery.

According to a second aspect of the present invention, there is provided a preparation method of an anode material for a sodium ion secondary battery having a composition formula of $Na_{1+x}V_{1-x}O_2$ (x=0.1 to 0.2), in which the preparation method includes a first process for mixing a sodium source material with a vanadium source material and a second process for preparing sodium vanadium oxide by heating a mixture obtained from the first process in a partially reducing atmosphere through a solid-state reaction.

Hereinafter, each step will be described.

First of all, the sodium source material and the vanadium source material may be mixed in a stoichiometric ratio (first process).

The sodium source material may be a material such as sodium carbonate ($Na_2CO_3$) that can provide sodium during a reaction. The vanadium source material may be a material such as vanadium oxide ($V_2O_3$) that can provide vanadium during a reaction.

The particles of the sodium source material and the particles of the vanadium source material may have an average particle diameter in a range of 100 nm to 20 μm.

The first process may be carried out by mechanically milling and mixing the particles of the sodium source material and the particles of the vanadium source material. A ball-milling process may be carried out using a zirconia ($ZrO_2$) ball at a rotary speed of 320 rpm for 2 hours. However, the first process is not limited thereto and may be carried out by other methods publicly known in the art.

Other details of the anode material for a sodium ion secondary battery having a composition formula of $Na_{1+x}V_{1-x}O_2$ (x=0.1 to 0.2) are the same as descried above.

Then, sodium vanadium oxide may be prepared by heating a mixture in a partially reducing atmosphere through a solid-state reaction (second process).

The partially reducing atmosphere may be formed by mixing a reducing gas and an inert gas. As the reducing gas, a hydrogen gas may be used. As the inert gas, a nitrogen gas, an argon gas, and the like may be used.

The partially reducing atmosphere may be a mixed gas atmosphere consisting of 90 mol % of nitrogen and 10 mol % of hydrogen. In particular, the ball-milled precursors (source materials) are transferred to an alumina crucible and then put in a tubular furnace having a diameter of 10 cm. Then, before a heat treatment is carried out, a mixed gas composed of 90 mol % of a nitrogen gas and 10 mol % of a hydrogen gas may be put into the tubular furnace for 1 hour. Thus, oxygen remaining in the tubular furnace may be removed, so that it is possible to prevent oxidation of the precursors and generation of impurities during a heat treatment.

A heating temperature may be in a range of 500° C. to 1300° C. and a time for a heat treatment may be in a range of 5 to 20 hours. Under these conditions, an oxidation number of the vanadium is not changed excessively, and thus generation of impurities caused by a change in oxidation number of the vanadium may be prevented. It is desirable to carry out a two-step heat treatment including a heat treatment carried out first at 600° C. for 10 hours and another heat treatment for increasing a temperature up to 1000° C. at a rate of 5° C./min.

The heated mixture is cooled and grounded in a mortar and then filtered by a sieve of 200 to 270 meshes, so that a uniform anode material of $Na_{1+x}V_{1-x}O_2$ may be prepared.

According to a third aspect of the present invention, there is provided a sodium ion secondary battery including a positive electrode, a negative electrode, a separation film positioned between the positive electrode and the negative electrode, and electrolyte, in which the negative electrode may include a material having a composition formula of $Na_{1+x}V_{1-x}O_2$ (x=0.1 to 0.2).

As the positive electrode, sodium metal may be used, and the negative electrode may include a material having a composition formula of $Na_{1+x}V_{1-x}O_2$ (x=0.0001 to 0.2). The separation film is positioned between the positive electrode and the negative electrode and configured to allow ions to pass therethrough and electrically separate the positive electrode from the negative electrode. As the separation film, polypropylene may be used. As the electrolyte, a solution containing sodium ions may be used.

The negative electrode for a sodium ion secondary battery according to the present aspect may be manufactured by the following method. Sodium vanadium oxide prepared according to the second aspect of the present invention may be used as an anode material, a polymer solution including a mixture of sodium carboxymethyl cellulose (1 wt % in water) and styrene butadiene rubber (40 wt % in water) may be used as a binder, and carbon black may be used as a conductor. By mixing and stirring them, slurry may be prepared.

The anode material may be included in an amount of 50 to 90 wt %, the binder may be included in an amount of 10 to 50 wt %, and the conductor may be included in an amount of 10 to 30 wt %. Most desirably, a ratio of the anode material, the binder, and the conductor may be 80 wt %:5 wt %:15 wt %. By mixing them, an adequate viscosity, that is 1000 to 3000 centipoise, may be maintained. In order to homogeneously mix the slurry, the slurry may be stirred by a homogenizer at a rotary speed of 5000 rpm for 30 minutes.

The homogenized slurry is applied at a uniform thickness of, for example, 30 to 200 μm to a copper foil having a thickness of 22 μm to be used as a current collector of the negative electrode using a doctor blade method, so that the negative electrode using the sodium vanadium oxide anode material may be manufactured.

The other positive electrode, separation film, and electrolyte may be manufactured using typical methods known in the art.

Hereinafter, the present invention will be described in detail with reference to Examples and Comparative Examples.

Example 1

Sodium carbonate ($Na_2CO_3$) powder and vanadium oxide ($V_2O_3$) powder were weighed stoichiometrically such that a molar ratio of sodium and vanadium became 1.1:0.9 and mixed by mechanical milling.

The mixed powder was put in a crucible and then put in a tubular furnace. After a heat treatment was carried out to the mixed powder at 600° C. for 10 hours in a mixed gas atmosphere composed of 90 mol % of a nitrogen gas and 10 mol % of a hydrogen gas, the mixed powder was naturally cooled. A second heat treatment was again carried out to the mixed powder at 1000° C. for 10 hours in the same atmosphere and then the mixed powder was naturally cooled.

At this time, in order to prevent oxidation of the mixed powder, before the heat treatments, the mixed gas composed of 90 mol % of the nitrogen gas and 10 mol % of the hydrogen gas was previously allowed to flow for 1 hour so as to remove oxygen.

The heat-treated mixture was grounded in a mortar and then filtered by a sieve of 200 meshes, so that $Na_{1.1}V_{0.9}O_2$ particles having a uniform particle size were obtained.

Example 2

$Na_{1.13}V_{0.87}O_2$ particles were obtained in the same manner as Example 1 except that sodium carbonate ($Na_2CO_3$) powder and vanadium oxide ($V_2O_3$) powder were weighed stoichiometrically such that a molar ratio of sodium and vanadium became 1.13:0.87.

Example 3

$Na_{1.16}V_{0.84}O_2$ particles were obtained in the same manner as Example 1 except that sodium carbonate ($Na_2CO_3$) powder and vanadium oxide ($V_2O_3$) powder were weighed stoichiometrically such that a molar ratio of sodium and vanadium became 1.16:0.84.

Evaluation

An X-ray diffraction (XRD) analysis on the powders prepared according to Examples 1 to 3 was carried out to check whether or not sodium vanadium oxide was produced, and powder phases were checked using a scanning electron microscope (SEM).

Further, batteries using the sodium vanadium oxide powders according to Examples 1 to 3 as anode materials were manufactured, and charge/discharge characteristics and cycle characteristics thereof were evaluated. Specifically, 3 g of a sodium vanadium oxide anode material from each Example, 0.56 g of carbon black as a conductor, and 5 g of a polymer solution including a mixture of sodium carboxymethyl cellulose (1 wt % in water) and styrene butadiene rubber (40 wt % in water) as a binder were mixed, and a viscosity of the mixture was adjusted to 2000 centipoise so as to be easily coated on a copper foil. Then, the mixture was stirred at a high speed of 5000 rpm for 30 minutes using a homogenizer. The stirred slurry was applied at a thickness of 80 μm to the copper foil having a thickness of 22 μm using a doctor blade method and then dried at 80° C. for 24 hours, so that a negative electrode was manufactured. After the dried negative electrode was punched out with a uniform diameter, the negative electrode and a sodium metal electrode were stacked and a polypropylene (PP) separation film was provided between the both electrodes. An electrolyte in which 1M $NaClO_4$ was dissolved in an organic solvent containing a mixture of ethylene carbonate/diethyl carbonate/propylene carbonate in a volume ratio of 1:1:1 was injected, so that a battery using a CR2032 coin cell was manufactured. Charge/discharge characteristics and cycle performance thereof were examined.

FIG. 1 shows a result of comparison of XRD patterns in sodium vanadium oxide powders according to Examples 1 to 3. Referring to FIG. 1, although the powders of Examples 1 to 3 have different stoichiometric ratios, a single phase pattern is observed from all of them.

Figure 2A:
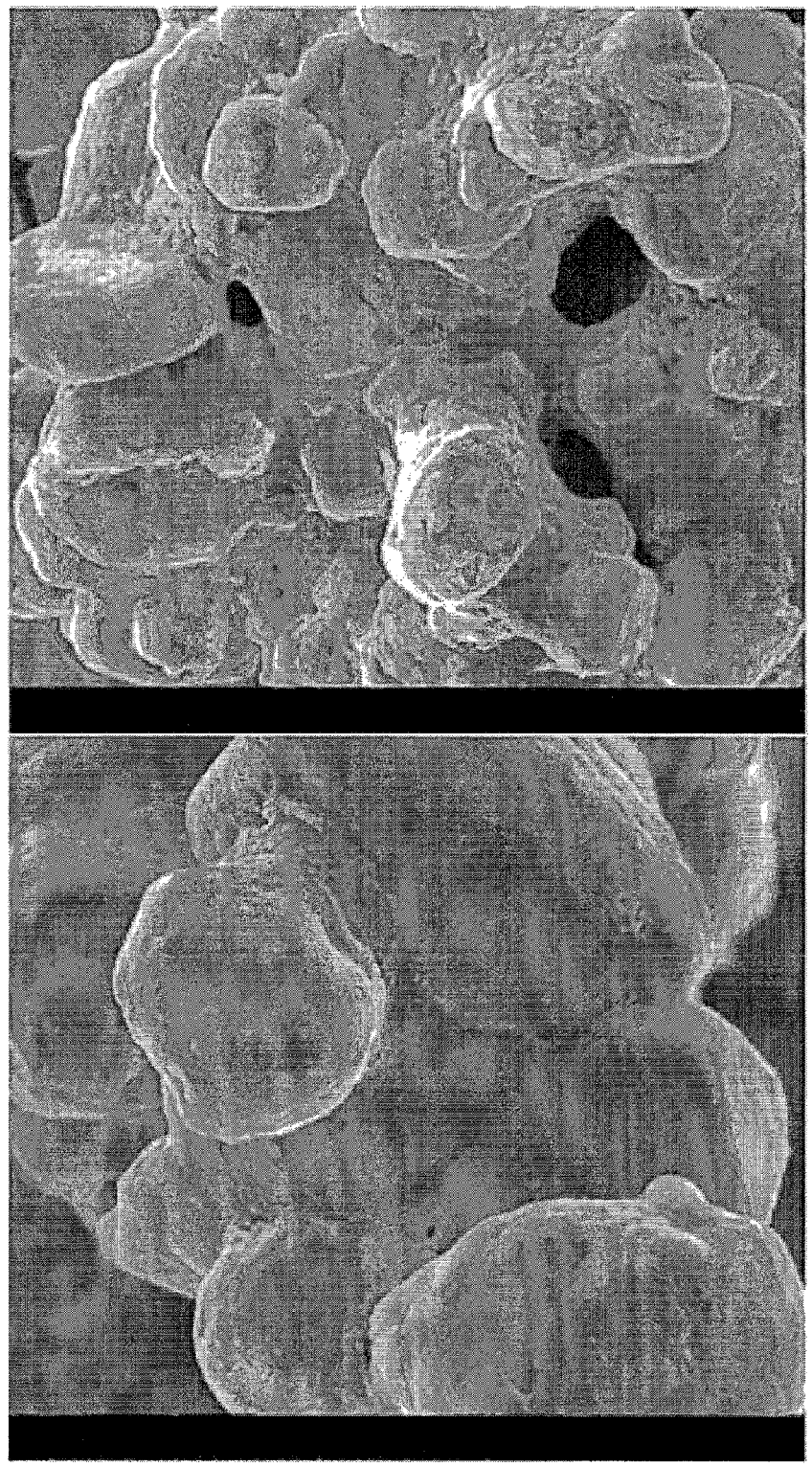
FIG. 2A provides scanning electron micrographs of sodium vanadium oxide powders according to Examples 1 (upper: ×5000, lower: ×10,000)
Figure 2B:
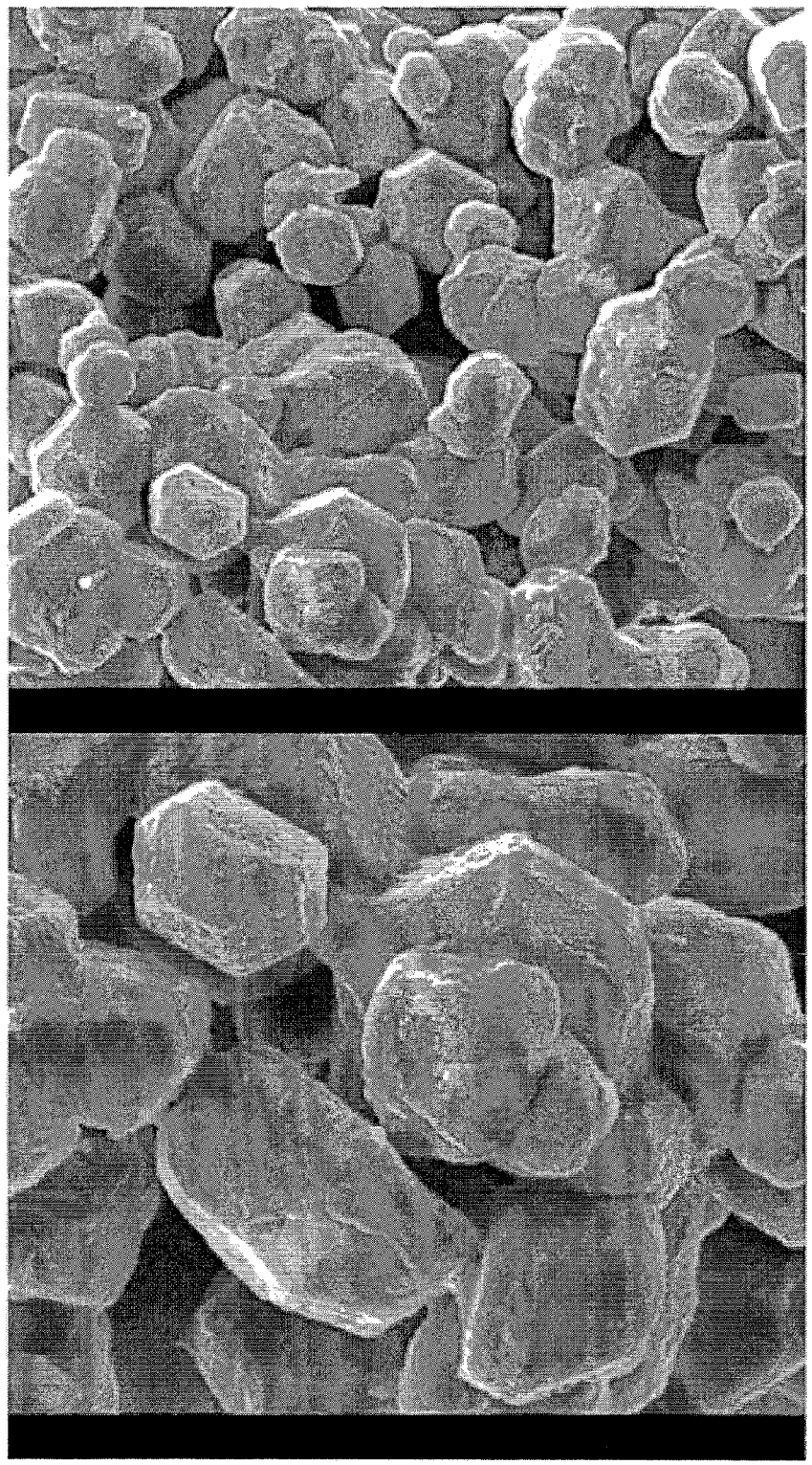
FIG. 2B provides scanning electron micrographs of sodium vanadium oxide powders according to Examples 2 (upper: ×5000, lower: ×10,000)
Figure 2C:
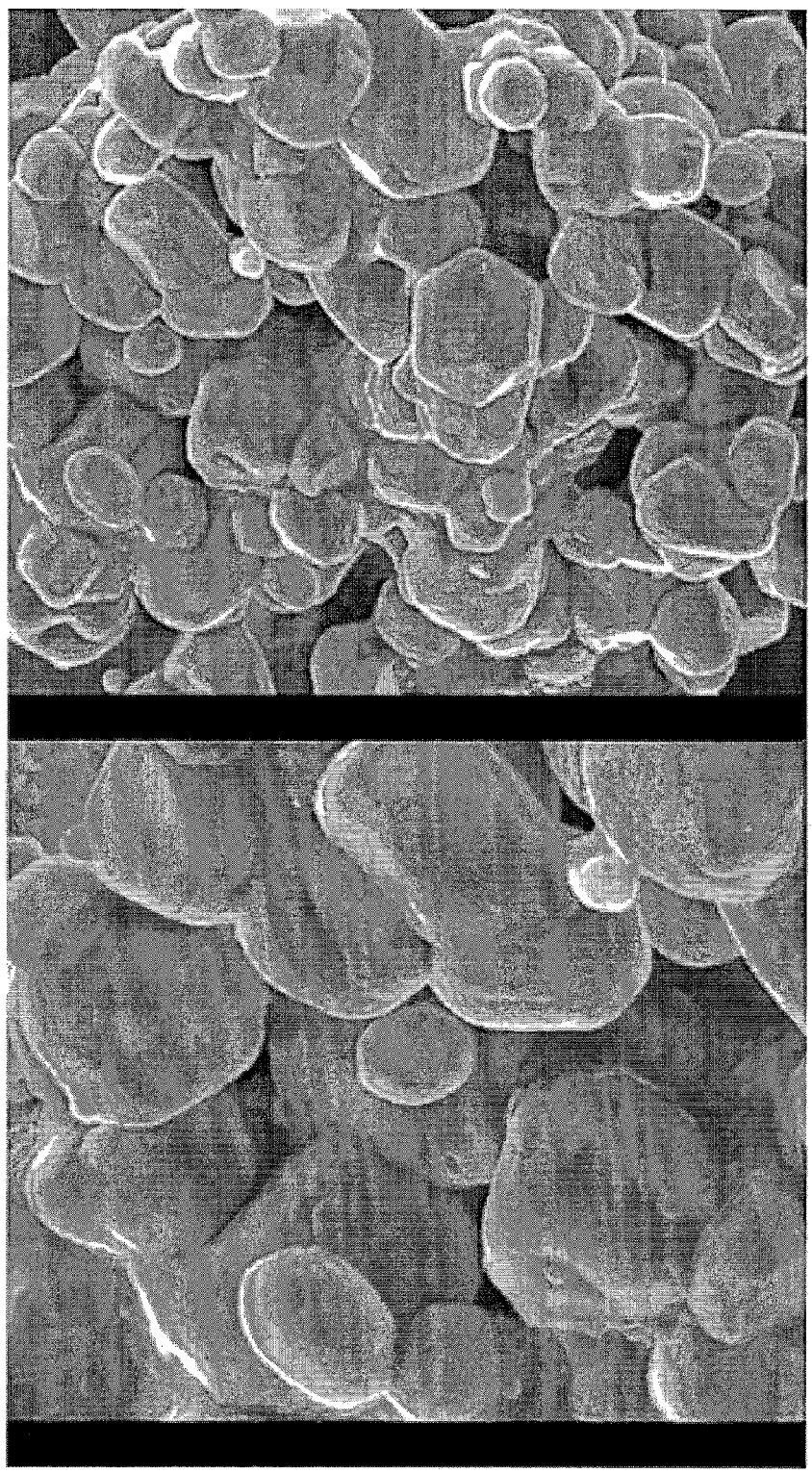
FIG. 2C provides scanning electron micrographs of sodium vanadium oxide powders according to Examples 3 (upper: ×5000, lower: ×10,000)

FIGS. 2A to 2C provide scanning electron micrographs of sodium vanadium oxide powders according to Examples 1 to 3, respectively. It can be seen from FIGS. 2A to 2C that sodium vanadium oxide-based anode materials have shapes close to a sphere, and as a sodium content is increased, a size tends to be decreased.

Figure 3:
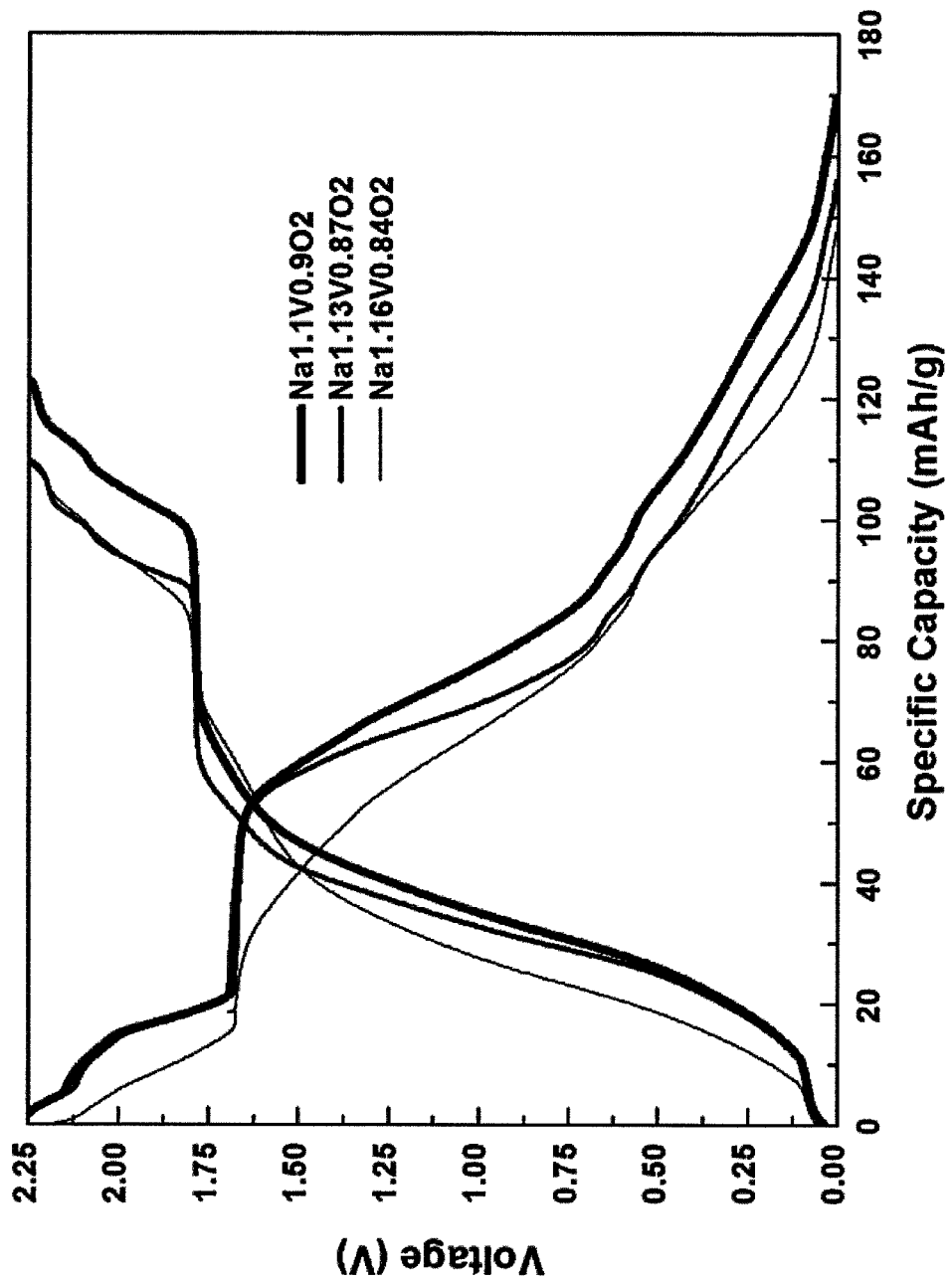
FIG. 3 shows charge/discharge voltage characteristic curves of a battery using sodium vanadium oxide as an anode material according to Examples 1 to 3.

FIG. 3 shows charge/discharge voltage characteristic curves of a coin cell manufactured using sodium vanadium oxide as an anode material according to Examples 1 to 3 when the coin cell is charged and discharged with a current of 13 mA/g. It can be seen from FIG. 3 that when the coin cell is charged, flat potentials are shown in the vicinity of 2.0 V, 1.75 V, and 0.75 V, and when the coin cell is discharged, flat potentials are shown at similar areas. Therefore, it can be confirmed that the sodium vanadium oxide-based negative electrodes manufactured according to the present invention have reversible charge/discharge characteristics.

Figure 4:
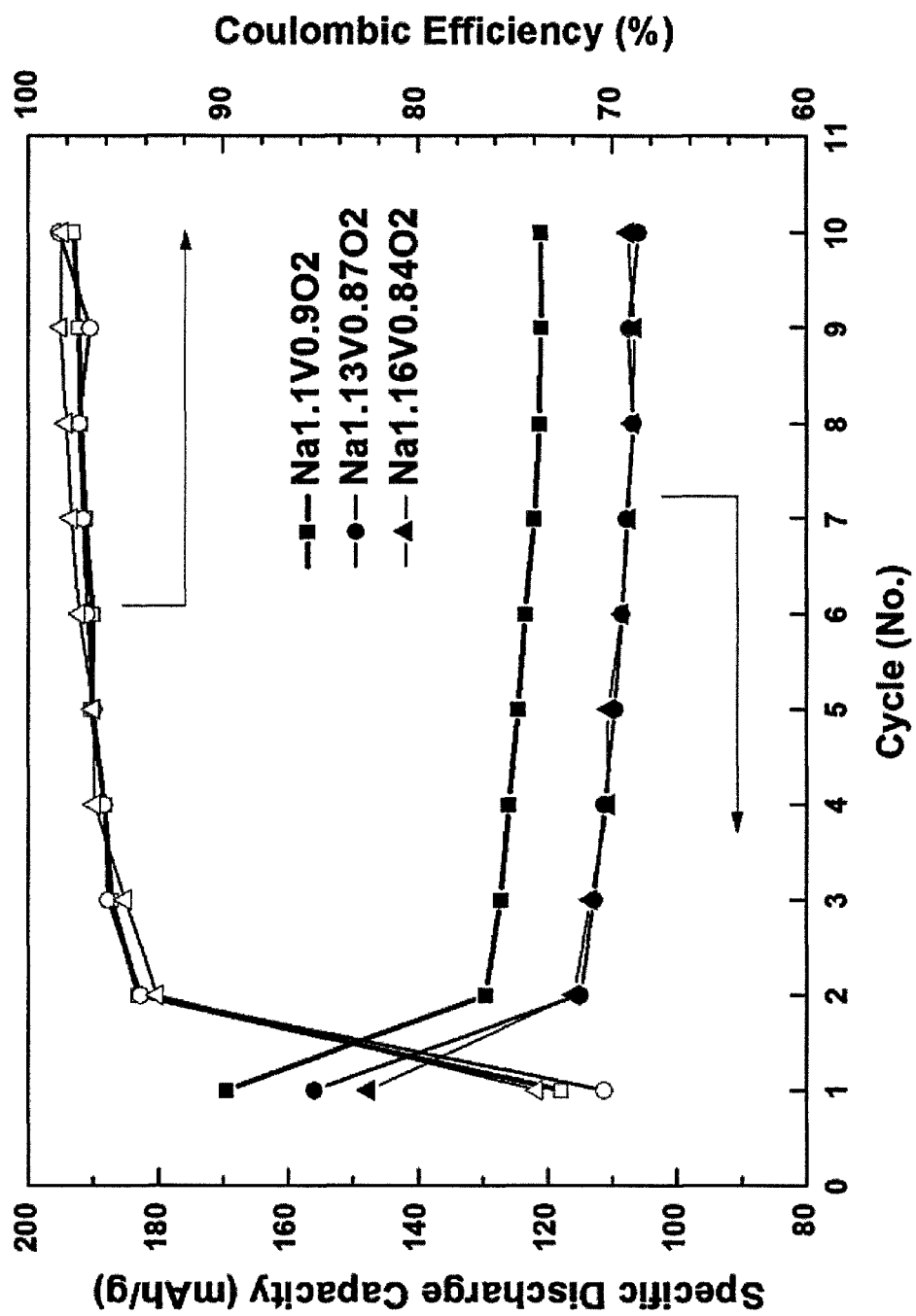
FIG. 4 is a result of cycle characteristics of a battery using sodium vanadium oxide as an anode material according to Examples 1 to 3.

FIG. 4 shows cycle characteristics of a coin cell manufactured using sodium vanadium oxide as an anode material according to Examples 1 to 3 when the coin cell is charged and discharged with a current of 13 mA/g in a potential range of 0.005 V to 2.25 V. It can be seen from FIG. 4 that an initial discharge capacity of Example 1 ($Na_{1.1}V_{0.9}O_2$) has the highest value of 170 mAh/g and has a stable cycle characteristic with 130 mAh/g till the 10th cycle. It can be seen that cycle efficiency is about 98% in all of the anode materials.

As described above, the sodium vanadium oxide-based anode material manufactured by the present invention satisfies characteristics generally required for a secondary battery. Therefore, it can be used as an anode material for a sodium battery.

The present invention is environmentally friendly and composed of simple steps. Therefore, according to the present invention, it is possible to mass-produce a sodium ion secondary battery anode material which is economical and has fewer impurities and excellent performance as compared with materials according to conventional methods.

According to the present invention, it is possible to improve low initial charge/discharge efficiency as the biggest problem in commercialization of a sodium vanadium oxide-based anode material, output characteristics, and cycle performance.

What is claimed is:

1. An anode material for a sodium ion secondary battery having a composition formula of $Na_{1+x}V_{1-x}O_2$ (x=0.1 to 0.2).

2. A preparation method of an anode material for a sodium ion secondary battery having a composition formula of $Na_{1+x}V_{1-x}O_2$ (x=0.1 to 0.2), the preparation method comprising:
   a first process for mixing a sodium source material with a vanadium source material; and
   a second process for preparing sodium vanadium oxide by heating a mixture obtained from the first process in a partially reducing atmosphere through a solid-state reaction.

3. The preparation method of claim 2, wherein the sodium source material includes sodium carbonate ($Na_2CO_3$).

4. The preparation method of claim 2, wherein the vanadium source material includes vanadium oxide ($V_2O_3$).

5. The preparation method of claim 2, wherein the partially reducing atmosphere is a mixed gas atmosphere composed of 90 mol % of nitrogen and 10 mol % of hydrogen.

6. The preparation method of claim 2, wherein the first process is carried out by mechanically milling and mixing particles of the sodium source material and particles of the vanadium source material.

7. The preparation method of claim 6, wherein the particles of the sodium source material and the particles of the vanadium source material have an average particle diameter in a range of 100 nm to 20 μm.

8. The preparation method of claim 2, wherein a heating temperature of the second process is in a range of 500° C. to 1300° C.

9. A sodium ion secondary battery comprising:
   a positive electrode;
   a negative electrode;
   a separation film positioned between the positive electrode and the negative electrode; and
   electrolyte,
   wherein the negative electrode includes a material having a composition formula of $Na_{1+x}V_{1-x}O_2$ (x=0.1 to 0.2).

* * * * *